United States Patent
Grün et al.

(10) Patent No.: US 6,583,246 B2
(45) Date of Patent: Jun. 24, 2003

(54) MODIFIERS FOR ANIONIC POLYMERIZATION

(75) Inventors: Michael Grün, Siegburg (DE); Thomas Knauf, Dormagen (DE); Wilfried Braubach, Solingen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/011,592

(22) Filed: Nov. 6, 2001

(65) Prior Publication Data

US 2002/0082370 A1 Jun. 27, 2002

(30) Foreign Application Priority Data

Nov. 9, 2000 (DE) .......................... 100 55 497

(51) Int. Cl.[7] .......................... C08F 4/00; C07C 217/04
(52) U.S. Cl. .......................... 526/220; 564/306; 564/346; 564/431; 564/434; 564/453; 564/454; 564/457; 564/461; 564/462; 564/503; 564/504; 564/508
(58) Field of Search ........................... 564/306, 346, 564/431, 434, 453, 454, 457, 461, 462, 503, 504, 508; 526/220

(56) References Cited

U.S. PATENT DOCUMENTS

| | | | |
|---|---|---|---|
| 3,294,768 A | 12/1966 | Wofford | 260/83.7 |
| 3,400,157 A | 9/1968 | Poppelsdorf | 260/584 |
| 3,426,072 A | 2/1969 | Warner | 260/584 |
| 3,480,675 A | 11/1969 | Poppelsdorf | 260/584 |
| 3,674,760 A | 7/1972 | Halasa | 260/83.7 |
| 3,957,875 A | 5/1976 | Ferrell et al. | 260/585 B |
| 4,022,959 A | 5/1977 | Sommer et al. | 526/180 |
| 5,008,343 A | 4/1991 | Hellermann et al. | 304/316 |
| 5,214,142 A | 5/1993 | King | 544/111 |
| 5,239,009 A | 8/1993 | Halasa et al. | 525/258 |
| 5,550,200 A | 8/1996 | Shibata et al. | 526/174 |
| 5,906,956 A | 5/1999 | Halasa et al. | 502/154 |
| 5,916,962 A | 6/1999 | Shibata et al. | 524/575 |

FOREIGN PATENT DOCUMENTS

| | | | | |
|---|---|---|---|---|
| FR | 2 263 228 | * | 10/1975 | C07C/93/14 |
| FR | 2 283 122 | * | 3/1976 | C07C/93/02 |

OTHER PUBLICATIONS

Database CAPLUS on STN, Acc. No. 1967:508361, Yamguchi et al., Bull. Chem. Soc. Jpn. (1967), 40(8), p. 1952–4 (abstract).*
Database CAPLUS on STN, Acc. No. 1981:15494, Takeuchi et al., J. Chem. Soc. Chem. Commun. (1980), 13, p. 593–4 (abstract).*
Database CAPLUS on STN, Acc. No. 1987:458140, Kostyanovskii et al., Izv. Akad. Nauk SSSR, Ser. Khim. (1986), 12, p. 2826–7 (abstract).*
Database CAPLUS on STN, Acc. No. 1998:804051, Yon--Hin, EP 882778 (abstract).*
Database CAPLUS on STN, Acc. No. 1985:542854, Noack et al., DD 219028 (abstract).*

* cited by examiner

*Primary Examiner*—Brian Davis
(74) *Attorney, Agent, or Firm*—Joseph C. Gil; Noland J. Cheung; Jennifer R. Seng

(57) ABSTRACT

The invention provides modifiers for the anionic polymerization of conjugated dienes or of conjugated dienes with vinylaromatic compounds, wherein the modifiers are specific aminoethers.

4 Claims, No Drawings

MODIFIERS FOR ANIONIC POLYMERIZATION

FIELD OF THE INVENTION

The invention provides modifiers for the anionic polymerization of conjugated dienes or of conjugated dienes with vinylaromatic compounds.

BACKGROUND OF THE INVENTION

It is known that the anionic polymerization of conjugated dienes, optionally in combination with other unsaturated compounds such as vinylaromatic compounds, is performed in the presence of a so-called modifier in order, for example, to regulate the concentration of vinyl groups in the polymer since, inter alia, the glass transition temperature and thus other properties such as rolling resistance and wet-skid resistance, which are important when making tires, can be affected via the vinyl concentration of the polymer.

Anionic polymerization is performed in a known manner in an inert organic solvent such as aliphatic or aromatic hydrocarbons, in the presence of organoalkali metal compounds, in particular alkyl lithium compounds, as initiators.

As mentioned, in particular during anionic polymerization, polar modifiers such as ethers and tertiary amines, which function as Lewis bases, are added to the reaction mixture in order to have an effect on the microstructure of the polymers. In this connection, reference is made to EP-A 0 304 589, DE-A 4 234 827, U.S. Pat. No. 4,022,959 and U.S. Pat. No. 5,906,956.

Known polar modifiers have either only ether structures (e.g. tert.-butoxyethoxyethane) or only tert.-a mine structures (e.g. N,N,N',N'-tetramethylethylene diamine) or are used in the form of cyclic compounds which have a combination of ether and tert.-amine structures (e.g. N-methylmorpholine).

The known above-mentioned polar modifiers, which are bidentate polar Lewis bases, are in particular still worthy of improvement, which relates e.g. to the ratio of modifier to initiator, the build-up of uniform chain statistics at low and at high temperatures and the incorporation of higher concentrations of vinyl groups in the polymer. In addition, known modifiers have the disadvantage that the vinyl concentration falls off drastically at high polymerization temperatures and is thus, subject to a temperature-sensitive microstructure regulation, such that block styrene is often incorporated and that larger amounts of modifier as compared with initiator are required during the preparation of polymers containing large amounts of vinyl units. Another disadvantage is the low boiling point of known modifiers and the poor separation from solvents which is associated with this.

SUMMARY OF THE INVENTION

Thus, the object of the invention was to provide modifiers for the anionic polymerization of conjugated dienes or of conjugated dienes with vinylaromatic compounds which do not have the disadvantages mentioned and, in particular, exhibit advantages with regard to the mode of preparation of the modifier and of microstructure regulation when using very small amounts of modifier and in addition enter into thermally stable coordination with the active anionic chain-ends.

DETAILED DESCRIPTION OF THE INVENTION

Thus, the invention provides modifiers for the anionic polymerization of conjugated dienes or of conjugated dienes with vinylaromatic compounds which are characterized in that they are based on aminoethers of the formula

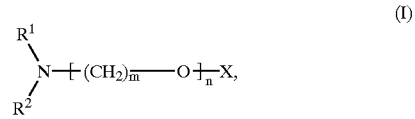

in which
R$^1$ and R$^2$ are identical or different and represent alkyl groups with 1 to 10, preferably 1 to 4 carbon atoms, cycloalkyl groups with 5 to 8, preferably 5 to 6 carbon atoms, aryl groups with 6 to 10, preferably 6 carbon atoms, and aralkyl groups with 7 to 15, preferably 7 to 9 carbon atoms, X represents

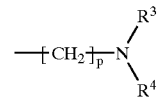

wherein R$^3$ and R$^4$ are defined in the same way as R$^1$ and R$^2$ and p represents an integer from 1 to 6, preferably 1 to 3, m is an integer from 1 to 6, preferably 1 to 3, and n is an integer from 1 to 6, preferably 1 to 3.

According to the present invention, those modifiers with the formulae given below are preferably used:

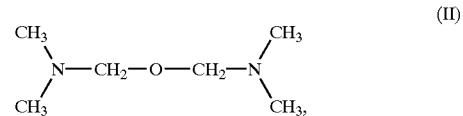

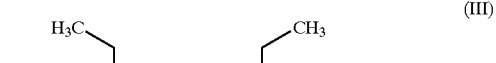

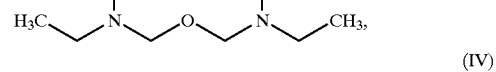

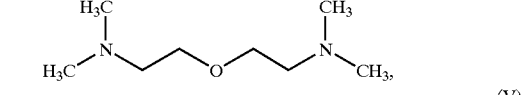

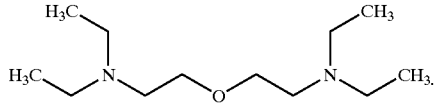

Modifiers according to the present invention can be prepared, for example, by processes described in the literature (e.g. EP-A 47 67 85, U.S. Pat. No. 3,400,157, U.S. Pat. No. 3,426,072, U.S. Pat. No. 3,480,675 and U.S. Pat. No. 3,957,875).

Modifiers according to the present invention may be used individually or in any combination at all with each other.

Obviously, modifiers according to the present invention may also be used together with randomizers or modifiers disclosed in the literature. Potassium compounds with the following formulae, for example, may be mentioned: $R_1OK$, $R_2COOK$, $R_3R_4NK$, wherein $R_1$, $R_2$, $R_3$ and $R_4$ are alkyl groups with 1 to 20 carbon atoms, cycloalkyl groups with 3 to 20 carbon atoms, alkenyl groups with 2 to 20 carbon atoms, aryl groups with 5 to 20 carbon atoms or phenyl groups.

Examples of $R_1OK$ are potassium salts of monohydric and polyhydric alcohols such as methanol, ethanol, n-propanol, isopropanol, tert.-butyl alcohol, tert.-amyl alcohol, hexanol, cyclohexanol, 2-butenol, 4-methylcyclohexanol, 3-cyclopentenol, 3-hexenol, allyl alcohol, 1,3-dihydrohexane, 1,5,9-trihydrotridecane, benzyl alcohol, phenol, catechol, pyrogallol or 1-naphthol.

Examples of $R_2COOK$ are potassium salts of monobasic or polybasic carboxylic acids such as lauric acid, palmitic acid, stearic acid, sebacic acid, phenylacetic acid, benzoic acid, phthalic acid or 1,8,16-hexadecanetricarboxylic acid.

Examples of $R_3R_4NK$ are potassium salts of secondary amines, in particular potassium salts of dimethylamine, di-n-butylamine, methyl-n-hexylamine, di(3-hexenyl)amine, diphenylamine or dibenzylamine. In this connection, reference is made to U.S. Pat. No. 5,550,200, U.S. Pat. No. 3,294,768, EP-A 0,603,886 and U.S. Pat. No. 3,674,760.

In addition, modifiers according to the present invention may be mixed with modifiers which contain either only nitrogen or only oxygen as the heteroatom, e.g. with N,N,N',N'-tetramethylethylenediamine, trialkylamines, N-methylmorpholine, N-phenylmorpholine, tetrahydrofuran, dioxan, diethylene glycol dimethyl ether and/or diethyl ether as are described e.g. in EP-A 0 304 589, DE-A 4 234 827, U.S. Pat. No. 4,022,959, U.S. Pat. No. 5,906,956.

The most suitable mixing ratio in a particular case can easily be determined by appropriate preliminary trials and is governed, inter alia, by the desired ultimate use of the polymers and by the desired structure for the microstructure.

Tridentate modifiers according to the present invention, which have a combination of tertiary amine groups and ether structural units, are used to prepare polymers based on conjugated dienes or copolymers based on conjugated dienes and vinylaromatic compounds.

Polymerization or copolymerization of the monomers mentioned is performed in the conventional way in a suitable solvent in the presence of organoalkali metal compounds as initiators, preferably alkali-lithium compounds such as methyl lithium, ethyl lithium, isopropyl lithium, n-butyl lithium, sec.butyl lithium, n-hexyl lithium, tert.octyl lithium, n-decyl lithium and aryl lithium compounds such as phenyl lithium, naphthyl lithium, 4-butylphenyl lithium, 4-phenylbutyl lithium and cyclohexyl lithium, wherein n-butyl lithium and sec.-butyl lithium are more preferred. The amount of lithium catalyst is governed by the type of organolithium compound and the molecular weight of the polymer being prepared.

Suitable inert organic solvents are: hydrocarbons with 5 to 12 carbon atoms, e.g. pentane, hexane, heptane and octane, and also their cyclic analogues. In addition, aromatic solvents, such as benzene or toluene, are also suitable. Obviously, mixtures of the previously described organic solvents may also be used.

Anionic polymerization is performed, as is well-known, at temperatures in the range 5° C. to 130° C.

The amount of organoalkali metal compounds is governed in particular by the molecular weight, which it is intended to set for the polymers. The most beneficial amount can easily be determined in preliminary trials.

Suitable conjugated dienes which can be used in the polymerization procedure are e.g.: 1,3-pentadiene, 2,3-dimethyl-1,3-butadiene, 2-ethylbutadiene, piperylene, 2-methyl-1,3-pentadiene, 4-butyl-1,3-pentadiene and 1,3-hexadiene, preferably 1,3-isoprene and 1,3-butadiene, in particular 1,3-butadiene.

Vinylaromatic compounds for copolymerization with the conjugated dienes which may be mentioned are, e.g.: 1-vinylnaphthalene, 2-vinylnaphthalene, styrene, 3-methylstyrene, 4-methylstyrene, 4-propylstyrene, 4-cyclohexylstyrene, 4-dodecylstyrene, 2-ethyl-4-benzylstyrene, 4-(phenylbutyl)-styrene, in particular styrene.

When copolymerizing conjugated dienes with vinylaromatic compounds, the proportions of each of the two monomers may be varied over a wide range. The conjugated dienes are preferably used during copolymerization in amounts of 95 to 50 wt. %, in particular 95 to 65 wt. %, with respect to 100 g of polymer. The vinyl concentration is generally 5 to 90, preferably 8 to 85 mass. %, with respect to the amount of conjugated dienes.

Modifiers according to the present invention are generally used during anionic polymerization in amounts of 0.1 to 40 mol, preferably 0.1 to 10 mol, with respect to one mole of initiator.

The present invention also provides polymers based on conjugated dienes or copolymers based on conjugated dienes and vinylaromatic compounds, which are prepared by anionic polymerization using modifiers according to the present invention.

Thus, polydienes, in particular polybutadiene rubber (BR), or rubber based on conjugated dienes and vinyl aromatic compounds, e.g. styrene/butadiene rubber (SBR), are obtained, with the aid of modifiers according to the present invention, which have the following characteristic physical features:

SBR: mol. wt.: 50,000 to 1,500,000 g/mol glass transition temperature in the range −70° C. to +5° C., preferably −65° C. to −5° C.

BR: mol. wt.: 50,000 to 1,500,000 g/mol glass transition temperature in the range −90° C. to −20° C., preferably −85° C. to −25° C.

Moreover, the present invention provides use of the polymers based on conjugated dienes or copolymers based on dienes and vinylaromatic compounds prepared using modifiers according to the present invention for producing industrial-grade rubber articles of all types, in particular for producing tires and tire components, such as tire treads and tire side-walls, as well as to modify plastics such as HIPS and ABS plastics.

To produce industrial-grade rubber articles, in particular tires, the polymers and copolymers obtained in accordance with the invention may obviously be mixed in the conventional way with a wide variety of synthetic rubbers and also with natural rubber in order to produce a specific set of physical properties for the rubber articles.

For example, it is possible to mix polymers and copolymers according to the present invention with natural rubber (NR), isoprene rubber (IR), styrene/butadiene rubber (SBR), butadiene rubber (BR), acrylonitrile/butadiene rubber (NBR), chloroprene (CR) and/or EPDM rubber, to be precise in conventional proportions, i.e. 10 to 90 mass. %.

Known rubber auxiliary agents and additives may also be added in a conventional manner and in known amounts for the particular purpose, to polymers or copolymers or their mixtures with other synthetic or natural rubbers, such as plasticizing oils, aromatic, aliphatic or naphthenic hydrocarbons, zinc oxide, stearic acid, resin acids, antioxidants and ozone protective waxes, as well as vulcanizing agents based on sulfur or peroxide.

In addition, active reinforcing agents, such as carbon blacks or silicas with different activities and their mixtures, may also be added to the polymers or copolymers, optionally in combination with known silanes.

Apart from vulcanizing agents, a wide variety of accelerators may also be added to the rubber mixtures, e.g. sulfenamides, guanidines, mercapto compounds, thiacarbamates or thiurams, in order to obtain high-quality rubber vulcanizates and to have a beneficial effect on the vulcanization process.

The beneficial amount of particular rubber auxiliary agents and additives can easily be determined by simple, orienting trials and is governed by the ultimate final use of the rubber vulcanizate.

Therefore, by using modifiers according to the present invention, it is possible to produce, during anionic polymerization, polymers based on conjugated dienes or copolymers based on conjugated dienes and vinylaromatic compounds which are characterized in particular by a narrow molecular weight distribution, thermally stable coordination of the active anionic polymers, by strictly alternating copolymerization at high and low reaction temperatures and good processability.

EXAMPLES

Example 1

850 g of technical grade hexane are initially introduced into a dry 2 l glass reactor superimposed by an atmosphere of nitrogen and 1.28 ml (1.06 mmol) of a 20.09% strength bis-(dimethylaminoethyl)-ethane solution are added thereto with stirring. 36 g of styrene, 112 g of 1,3-butadiene and 0.42 ml (1.06 mmol) of a 23% strength solution of BuLi in hexane are added virtually simultaneously. Then a pressure of 2–3 bar is applied by adjusting the nitrogen in the reactor and the mixture is heated to 60–70° C. Reaction is complete 90 min after the start of reaction. Then the contents of the reactor are cooled and discharged into a vessel superimposed by an atmosphere of nitrogen and stabilized with 2.5 g of Vulkanox®BHT in hexane. Then the polymer is precipitated with about 4 l of ethanol and dried at 60° C. in a vacuum drying cabinet.

The microstructure was determined using IR and the molecular weight was determined by GPC using THF as the mobile phase.

Analysis:

TABLE 1

| Mooney ML 1+4 | 1,4-cis [%] | 1,4-trans [%] | 1,2-vinyl [%] | styrene [%] | $M_w$ [g/mol] | poly-dispersity | $T_g$ [° C.] |
|---|---|---|---|---|---|---|---|
| 48 | 11.6 | 15.2 | 49.8 | 24 | 277930 | 1.2 | −24.6° C. |

Example 2

850 g of technical grade hexane are initially introduced into a dry 2 l glass reactor superimposed by an atmosphere of nitrogen and 0.22 mmol of bis-(dimethylaminoethyl)-ethane solution are added thereto with stirring. 36 g of styrene, 112 g of 1,3-butadiene and 0.42 ml (1.06 mmol) of a 23% strength solution of BuLi in hexane are added virtually simultaneously. Then a pressure of 2–3 bar is applied by adjusting the nitrogen in the reactor and the mixture is heated to 60–70° C. The trial is allowed to react to completion over the course of 90 min from the start of the trial. Then the contents of the reactor are cooled and discharged into a vessel superimposed by an atmosphere of nitrogen and stabilized with 2.5 g of Vulkanox®BHT in hexane. Then the polymer is precipitated with about 4 l of ethanol and dried at 60° C. in a vacuum drying cabinet.

The microstructure was determined using IR and the molecular weight was determined by GPC using THF as the mobile phase.

TABLE 2

| Mooney ML 1+4 | 1,4-cis [%] | 1,4-trans [%] | 1,2-vinyl [%] | styrene [%] | $M_w$ [g/mol] | poly-dispersity | $T_g$ [° C.] |
|---|---|---|---|---|---|---|---|
| 28 | 22.2 | 34.9 | 20.8 | 22.2 | 238829 | 1.11 | −51.7 |

Example 3

The trial was performed as described in Example 1, but at a temperature of 110° C. The microstructure was determined using IR and the molecular weight was determined by GPC using THF as the mobile phase.

TABLE 3

| Mooney ML 1+4 | 1,4-cis [%] | 1,4-trans [%] | 1,2-vinyl [%] | styrene [%] | $M_w$ [g/mol] | poly-dispersity | $T_g$ [° C.] |
| --- | --- | --- | --- | --- | --- | --- | --- |
| 48 | 13.1 | 17.6 | 45.0 | 24.5 | 280393 | 1.26 | −26.8° C. |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Polymers comprising conjugated dienes or copolymers comprising conjugated dienes and vinylaromatic compounds, prepared by anionic polymerization using modifiers comprising aminoethers of the formula $$\overset{R^1}{\underset{R^2}{\diagdown}}N\text{—}(CH_2)_{\overline{m}}\text{—}O\text{—}_{\overline{n}}X \quad (I)$$

wherein

R$^1$ and R$^2$ are identical or different and represent alkyl groups with 1 to 10 carbon atoms, cycloalkyl groups with 5 to 8 carbon atoms, aryl groups with 6 to 10 carbon atoms, and aralkyl groups with 7 to 15 carbon atoms, wherein X represents $$\text{—}(CH_2)_{\overline{p}}\text{—}N\overset{R^3}{\underset{R^4}{\diagup}}$$

R$^3$ and R$^4$ are defined in the same way as R$^1$ and R$^2$ and p represents an integer from 1 to 6, m is an integer from 1 to 6 and n is an integer from 1 to 6.

2. Industrial-grade rubber articles comprising polymers comprising conjugated dienes or copolymers comprising conjugated dienes and vinylaromatic compounds, prepared by anionic polymerization using modifiers comprising aminoethers of the formula $$\overset{R^1}{\underset{R^2}{\diagdown}}N\text{—}(CH_2)_{\overline{m}}\text{—}O\text{—}_{\overline{n}}X \quad (I)$$

wherein

R$^1$ and R$^2$ are identical or different and represent alkyl groups with 1 to 10 carbon atoms, cycloalkyl groups with 5 to 8 carbon atoms, aryl groups with 6 to 10 carbon atoms, and aralkyl groups with 7 to 15 carbon atoms, X represents $$\text{—}(CH_2)_{\overline{p}}\text{—}N\overset{R^3}{\underset{R^4}{\diagup}}$$

wherein

R$^3$ and R$^4$ are defined in the same way as R$^1$ and R$^2$ and p represents an integer from 1 to 6, m is an integer from 1 to 6 and n is an integer from 1 to 6.

3. Industrial-grade rubber articles according to claim 2, wherein said rubber articles are tires and tire components.

4. A process for modifying plastics comprising the steps of mixing a plastic and a polymer comprising conjugated dienes or a copolymer comprising conjugated dienes and vinylaromatic compounds, prepared by anionic polymerization using modifiers comprising aminoethers of the formula $$\overset{R^1}{\underset{R^2}{\diagdown}}N\text{—}(CH_2)_{\overline{m}}\text{—}O\text{—}_{\overline{n}}X \quad (I)$$

wherein

R$^1$ and R$^2$ are identical or different and represent alkyl groups with 1 to 10 carbon atoms, cycloalkyl groups with 5 to 8 carbon atoms, aryl groups with 6 to 10 carbon atoms, and aralkyl groups with 7 to 15 carbon atoms, X represents $$\text{—}(CH_2)_{\overline{p}}\text{—}N\overset{R^3}{\underset{R^4}{\diagup}}$$

wherein

R$^3$ and R$^4$ are defined in the same way as R$^1$ and R$^2$ and p represents an integer from 1 to 6, m is an integer from 1 to 6 and n is an integer from 1 to 6.

* * * * *